No. 857,523. PATENTED JUNE 18, 1907.
B. J. HENDRIKS.
STEAM COOKING APPARATUS.
APPLICATION FILED MAY 4, 1906.
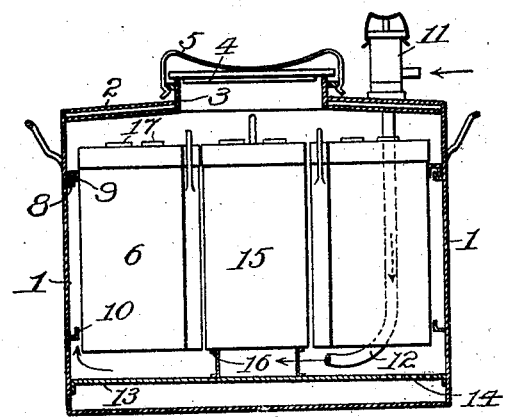
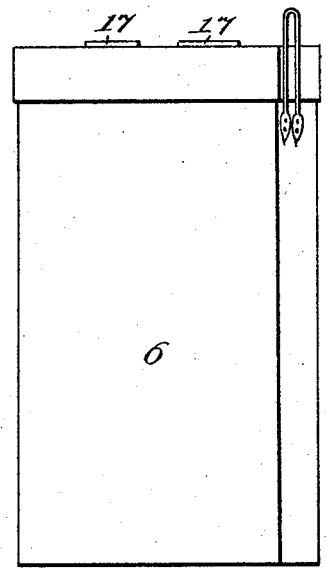
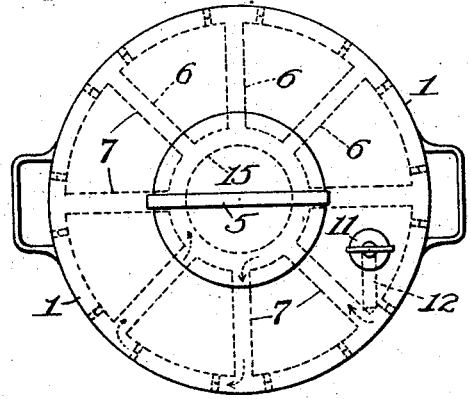
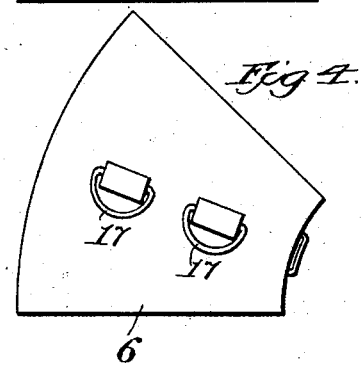
Witnesses:
Inventor
Bartholomeus Justus Hendriks
By B. Singer
Atty.

UNITED STATES PATENT OFFICE.

BARTHOLOMEUS JUSTUS HENDRIKS, OF LIENDEN, NEAR KESTEREN, NETHERLANDS.

STEAM COOKING APPARATUS.

No. 857,523.  Specification of Letters Patent.  Patented June 18, 1907.

Application filed May 4, 1906. Serial No. 315,190.

*To all whom it may concern:*

Be it known that I, BARTHOLOMEUS JUSTUS HENDRIKS, merchant, a subject of the Queen of the Netherlands, residing at Lienden, by Kesteren, Gelderland, the Netherlands, and whose post address is Oudschmitstraat Meerten 8, have invented a certain new and useful Improved Steam Cooking Apparatus, of which the following is a specification.

The invention relates to an improved steam cooking apparatus and it has for its object to provide a steam cooking apparatus designed to contain a number of food receptacles, the said receptacles being arranged so that small spaces are left between them through which the steam circulates, in order to expedite the cooking operations.

In the appended drawing illustrating the invention Figure 1 shows a vertical section of the steam cooking apparatus. Fig. 2 is a plan, and Figs. 3 and 4 show respectively a side elevation and plan of a food receptacle or cooking vessel.

As will be seen on reference to the drawings, the steam cooking apparatus comprises a cylindrical vessel 1 formed of any suitable material and fitted with an obliquely inclined double-walled cover or top 2, in the form of a truncate cone with an annular orifice, or mouth, 3. The orifice or mouth 3 can be closed hermetically by a suitable plate or lid 4, which is pressed down, by a spring 5, upon the mouth 3. Inside the vessel 1, a number of sector-shaped food receptacles or cooking vessels 6 are arranged in a circle, so that small spaces 7 are left between them for the circulation of steam. The food receptacles 6 may either be placed on projecting ledges on the bottom of the vessel 1 or, as shown by the drawings, suspended from hooks 8 fixed in the vessel 1, eyes 9 being attached to the receptacles 6. Distance bars 10 serve to insure the exactly vertical suspension of the receptacles 6. The steam is admitted into the apparatus by means of a steam regulating valve 11, and a steam pipe 12; the steam, on issuing from the orifice of the pipe 12, will circulate in the spaces between the food receptacles 6. To increase the condensation of steam, a certain quantity of water is provided at the bottom of the vessel, and at a slight distance from the water level, an inclined plate 13 is arranged, upon which the condensed water will drip, flowing off through the apertures 14 in the plate 13, into the water space at the bottom of the vessel. The food receptacles 6 are therefore played upon exclusively by steam. The cylindrical central space remaining, in the middle of the vessel, between the food receptacles 6, may contain a suitable cylindrical food receptacle 15, placed on a projecting ledge 16 of plate 13. For the readier removal of the receptacles 6 and 15 from the vessel 1, they are provided with handles 17, in a suitable manner.

As soon as the food contained in the receptacles is sufficiently cooked, the steam supply is shut off by means of the valve 11; the steam in the vessel 1 will be condensed, causing a partial vacuum in the vessel, so that the closing plate 4 is pressed firmly, and absolutely hermetically, upon the mouth 3, not only by the power of the spring 5 but also by the external air pressure. By means of this hermetical closing, the cooked food may be kept without spoiling, for a considerable time, contained in the sterilized air remaining in the vessel 1.

Having now particularly described and ascertained the nature of my said invention, and in what manner the same is to be performed, I declare that what I claim is:

1. A steam cooking apparatus comprising in combination, a cylindrical steaming chamber, means for delivering steam thereto, a plurality of sector shaped food receptacles suspended in said chamber and forming a central open space, a food receptacle suspended in said space, an inclined perforated diaphragm dividing said chamber into two compartments and permitting water condensation to pass from the uppermost to the lowermost compartment, a closure for said steaming chamber, and means for holding said closure in place.

2. A steam cooking apparatus comprising a cylindrical steam chamber provided with an upper wall having an opening, said wall slanting downwardly from said opening, a closure for said opening, a spring composed of a flat strip of metal engaging said closure, lugs with which said spring is connected, an inclined perforated diaphragm dividing said chamber into two compartments and permitting water of condensation to pass from one compartment to the other, a plurality of sector shaped food receptacles located out of engagement with each other to form spaces intervening the same and also to form a central space, interlocking hook members for said receptacles and said steam chamber for supporting the former out of engagement with the walls of said chamber, distance pieces for said chamber engaging the lower portions of said receptacles for maintaining them in a generally vertical position, a cylindrical food receptacle disposed in said central space out of contact with said sector shaped receptacles, supports for said cylindrical receptacle mounted on said diaphragm, and means for supplying steam to said chamber.

3. A steam cooking apparatus comprising a cylindrical steam chamber provided with an upper wall having an opening, said wall slanting downwardly from said opening, a closure for said opening, yieldingly acting means engaging said closure to hold the same in place, an inclined perforated diaphragm dividing said chamber into two compartments and permitting water of condensation to pass from one compartment to the other, a plurality of sector shaped food receptacles located out of engagement with each other to form spaces intervening the same and also to form a central space, interlocking hook members for said receptacles and said steam chamber for supporting the former out of engagement with the walls of said chamber, distance pieces for said chamber engaging the lower portions of said receptacles for maintaining them in a generally vertical position, and means for supplying steam to said chamber.

4. A steam cooking apparatus comprising a cylindrical steam chamber provided with an upper wall having an opening, said wall slanting downwardly from said opening, a closure for said opening, an inclined perforated diaphragm dividing said chamber into two compartments and permitting water of condensation to pass from one compartment to the other, a plurality of sector shaped food receptacles located out of engagement with each other to form spaces intervening the same, interlocking hook members for said receptacles and said steam chamber for supporting the former out of engagement with the walls of said chamber, distance pieces for said chamber engaging the lower portions of said receptacles for maintaining them in a generally vertical position, and means for supplying steam to said chamber.

5. A steam cooking apparatus comprising in combination, a steaming chamber, a plurality of food receptacles for said chamber, supporting hooks projecting from said chamber and receptacles near the tops of the latter, and distance pieces near the lower ends of said receptacles whereby the entire area of said receptacles is exposed to the action of steam, said hooks and spacing pieces supporting said receptacles in horizontal alinement.

6. A steam cooking apparatus comprising in combination, a cylindrical steaming chamber, a plurality of sector-shaped food receptacles therefor shaped and arranged to form a central space, a cylindrical food receptacle disposed in said central space, means for supporting said sector shaped food receptacles out of contact with each other and out of engagement with said chamber and in horizontal alinement with each other, and means for supporting said cylindrical food receptacle out of contact with said sector-shaped receptacles and said chamber, and in horizontal alinement with said sector shaped receptacle.

7. A steam cooking apparatus comprising in combination, a steaming chamber, means delivering steam thereto, an inclined diaphragm dividing said chamber into two compartments and permitting water of condensation to flow from one compartment to the other, a plurality of food receptacles for said steaming chamber arranged to form a central space, a receptacle for said central space, and means for supporting said receptacles out of engagement with each other and out of engagement with said diaphragm and said steaming chamber, said receptacles being in horizontal alinement with each other.

8. A steam cooking apparatus comprising in combination, a steaming chamber, means delivering steam thereto, an inclined perforated diaphragm dividing said chamber into two compartments and permitting water of condensation to flow from one compartment to the other, a plurality of food receptacles for said chamber, horizontally arranged means for supporting said food receptacles in said chamber free from engagement with each other and free from engagement with said chamber and diaphragm, a centrally disposed food receptacle, and means carried by said diaphragm and supporting said central receptacle out of engagement with said first mentioned receptacles and out of engagement with said diaphragm.

In witness whereof I have hereunto set my hand in presence of two witnesses.

BARTHOLOMEUS JUSTUS HENDRIKS.

Witnesses:
C. LAARMAN,
N. Y. VERHOEFF.